(12) United States Patent
Onose et al.

(10) Patent No.: US 12,326,708 B2
(45) Date of Patent: Jun. 10, 2025

(54) DATA COLLECTION DEVICE

(71) Applicant: FANUC CORPORATION, Yamanashi (JP)

(72) Inventors: Nao Onose, Yamanashi (JP); Yuusuke Kobayashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 366 days.

(21) Appl. No.: 17/759,621

(22) PCT Filed: Jan. 27, 2021

(86) PCT No.: PCT/JP2021/002787
§ 371 (c)(1),
(2) Date: Jul. 28, 2022

(87) PCT Pub. No.: WO2021/153598
PCT Pub. Date: Aug. 5, 2021

(65) Prior Publication Data
US 2023/0051489 A1 Feb. 16, 2023

(30) Foreign Application Priority Data

Jan. 29, 2020 (JP) .................................. 2020-012539

(51) Int. Cl.
*G05B 19/406* (2006.01)
(52) U.S. Cl.
CPC .. *G05B 19/406* (2013.01); *G05B 2219/50185* (2013.01)
(58) Field of Classification Search
None
See application file for complete search history.

(56) References Cited

U.S. PATENT DOCUMENTS

2004/0054660 A1* 3/2004 McCormick ........ G06F 16/2428
2016/0363925 A1* 12/2016 Oohashi ............. G05B 19/4065
(Continued)

FOREIGN PATENT DOCUMENTS

| JP | 2015156182 A | 8/2015 |
| JP | 2018107315 A | 7/2018 |
| JP | 2019109697 A | 7/2019 |

OTHER PUBLICATIONS

International Search Report in PCT/JP2021/002787, mailed Apr. 6, 2021. 2pp.

*Primary Examiner* — Kidest Bahta
(74) *Attorney, Agent, or Firm* — HAUPTMAN HAM, LLP (57) ABSTRACT

A collection device includes a state correlation information storage unit that stores state correlation information indicating correlative relationships between control information relating to control of an industrial machine and environment information relating to the environment of the industrial machine, a control information acquisition unit that acquires control information from the industrial machine, an environment information acquisition unit that acquires environment information relating to the environment of the industrial machine, a state inference unit that infers the current state of the industrial machine on the basis of the control information, the environment information, and the state correlation information, and a proxy response unit that responds to an inquiry from another device on behalf of the industrial machine on the basis of the inferred state of the industrial machine.

12 Claims, 7 Drawing Sheets

(56) References Cited

U.S. PATENT DOCUMENTS

| | | |
|---|---|---|
| 2017/0031329 A1* | 2/2017 | Inagaki .................... B25J 9/163 |
| 2018/0205803 A1* | 7/2018 | Asenjo ............... G06Q 30/0201 |
| 2018/0314234 A1* | 11/2018 | Zhang .................. B23K 26/342 |
| 2018/0354125 A1* | 12/2018 | Ueda ..................... G05B 19/425 |
| 2019/0187666 A1 | 6/2019 | Sugiyama et al. |

* cited by examiner

|   | VIBRATION SENSOR [Hz] | TEMPERATURE SENSOR [°C] | SPINDLE ROTATION SPEED [rpm] | ALARM INFORMATION | ... |
|---|---|---|---|---|---|
| 1 | 700 | 50 | 1000 | ALARM OFF | ... |
| 2 | 1500 | 160 | 3000 | SPINDLE OVERHEATING | ... |
| 3 | 900 | 70 | 2000 | ALARM OFF | ... |
| 4 | 500 | 150 | 1500 | ALARM OFF | ... |
| ... | ... | ... | ... | ... | ... |

FIG.4

CONTROL INFORMATION:

| SPINDLE ROTATION SPEED [rpm] |
|---|
| 1800 |

ENVIRONMENT INFORMATION:

| VIBRATION SENSOR [Hz] | TEMPERATURE SENSOR [°C] |
|---|---|
| 800 | 80 |

FIG.5

$$\text{SIMILARITY } R = \cfrac{1}{\sqrt{1 \times \left(\text{SPINDLE ROTATION SPEED DIFFERENCE}\right)^2 + 1 \times \left(\text{VIBRATION VALUE DIFFERENCE}\right)^2 + 1 \times \left(\text{TEMPERATURE VALUE DIFFERENCE}\right)^2}}$$

CONTROL INFORMATION:

| SPINDLE ROTATION SPEED [rpm] |
|---|
| 1800 |

ENVIRONMENT INFORMATION:

| VIBRATION SENSOR [Hz] | TEMPERATURE SENSOR [°C] |
|---|---|
| 800 | 80 |

| | VIBRATION SENSOR [Hz] | TEMPERATURE SENSOR [°C] | SPINDLE ROTATION SPEED [rpm] | ALARM INFORMATION | SIMILARITY |
|---|---|---|---|---|---|
| 1 | 700 | 50 | 1000 | ALARM OFF | $1.23 \times 10^{-3}$ |
| 2 | 1500 | 160 | 3000 | SPINDLE OVERHEATING | $7.19 \times 10^{-4}$ |
| 3 | 900 | 70 | 2000 | ALARM OFF | $4.47 \times 10^{-3}$ |
| 4 | 500 | 150 | 1500 | ALARM OFF | $2.33 \times 10^{-3}$ |
| ⋮ | ⋮ | ⋮ | ⋮ | ⋮ | ⋮ |

FIG.6

$$\text{SIMILARITY } R = \sqrt{\cfrac{1}{1 \times \left(\begin{array}{c}\text{SPINDLE ROTATION}\\ \text{SPEED DIFFERENCE}\end{array}\right)^2 + 1 \times \left(\begin{array}{c}\text{VIBRATION VALUE}\\ \text{DIFFERENCE}\end{array}\right)^2}}$$

CONTROL INFORMATION:

| SPINDLE ROTATION SPEED [rpm] |
|---|
| 1200 |

ENVIRONMENT INFORMATION:

| VIBRATION SENSOR [Hz] |
|---|
| 450 |

| | VIBRATION SENSOR [Hz] | TEMPERATURE SENSOR [°C] | SPINDLE ROTATION SPEED [rpm] | ALARM INFORMATION | SIMILARITY |
|---|---|---|---|---|---|
| 1 | 700 | 50 | 1000 | ALARM OFF | 3.12×10⁻³ |
| 2 | 1500 | 160 | 3000 | SPINDLE OVERHEATING | 4.79×10⁻⁴ |
| 3 | 900 | 70 | 2000 | ALARM OFF | 1.09×10⁻³ |
| 4 | 500 | 150 | 1500 | ALARM OFF | 3.29×10⁻³ |
| ⋮ | ⋮ | ⋮ | ⋮ | ⋮ | ⋮ |

FIG.7

$$\text{SIMILARITY } R = \frac{1}{\sqrt{1 \times (\text{VIBRATION VALUE DIFFERENCE})^2 + 1 \times (\text{TEMPERATURE VALUE DIFFERENCE})^2}}$$

CONTROL INFORMATION:

| ALARM STATE |
|---|
| ALARM OFF |

ENVIRONMENT INFORMATION:

| VIBRATION SENSOR [Hz] | TEMPERATURE SENSOR [°C] |
|---|---|
| 800 | 80 |

| | VIBRATION SENSOR [Hz] | TEMPERATURE SENSOR [°C] | SPINDLE ROTATION SPEED [rpm] | ALARM INFORMATION | SIMILARITY |
|---|---|---|---|---|---|
| 1 | 700 | 50 | 1000 | ALARM OFF | 9.58×10⁻³ |
| 2 | 1500 | 160 | 3000 | SPINDLE OVERHEATING | - |
| 3 | 900 | 70 | 2000 | ALARM OFF | 9.95×10⁻³ |
| 4 | 500 | 150 | 1500 | ALARM OFF | 3.25×10⁻³ |
| ⋮ | ⋮ | ⋮ | ⋮ | ⋮ | ⋮ |

FIG.8

| INFORMATION ITEM | $a_1$ | $a_2$ | ... | $b_1$ | $b_2$ | ... |
|---|---|---|---|---|---|---|
| SPINDLE ROTATION SPEED | $a_{1\text{-}1}$ | $a_{2\text{-}1}$ | ... | $b_{1\text{-}1}$ | $b_{2\text{-}1}$ | ... |
| TEMPERATURE VALUE | $a_{1\text{-}2}$ | $a_{2\text{-}2}$ | ... | $b_{1\text{-}2}$ | $b_{2\text{-}2}$ | ... |
| VIBRATION VALUE | $a_{1\text{-}3}$ | $a_{2\text{-}3}$ | ... | $b_{1\text{-}3}$ | $b_{2\text{-}3}$ | ... |
| ... | ... | ... | ... | ... | ... | ... |

DATA COLLECTION DEVICE

RELATED APPLICATIONS

The present application is a National Phase of International Application No. PCT/JP2021/002787 filed Jan. 27, 2021, which claims priority to Japanese Patent Application No. 2020-012539, filed Jan. 29, 2020.

TECHNICAL FIELD

The present invention relates to a data collection device.

BACKGROUND ART

On a manufacturing site where industrial machines such as machine tools are disposed, a plurality of industrial machines are connected to a network, and data collection is performed via the network. In this type of environment, a large volume of network communication may be performed between the respective industrial machines and a data collection device for collecting data about the industrial machines. Meanwhile, the industrial machines have to also transmit data to applications running on other devices as well as the data collection device. As a result, a large load is placed on the network laid in the manufacturing site in order to transmit data to the data collection device and also to transmit data to other devices.

When collecting data, there is a possibility of data missing for various reasons. Particularly in a case where data are collected via a network, when an industrial machine attempts to transmit data at a planned timing, it may be impossible to transmit the data satisfactorily if the network load is high. In this case, the data reception side (the data collection device or another device) often takes measures in relation to the data that could not be received such as inserting a median value of the data received before and after the missing data or handling the value of the missing data as an empty value (0 or a null character, for example).

In a conventional technique for reducing missing data of this type, the communication load during high-speed data sampling is reduced by performing trigger control in accordance with a signal so that information is acquired only when needed (PTL 1 and so on). By applying this technique, information is collected only when the information is wanted, and as a result, a reduction in the communication load can be expected.

CITATION LIST

Patent Literature

[PTL 1] Japanese Patent Application Publication No. 2019-109697

SUMMARY OF INVENTION

Technical Problem

When manufacturing is performed on a manufacturing site, a plurality of industrial machines operate constantly. To manage the plurality of industrial machines, it is necessary to constantly collect data required for management. In such cases where information is constantly required, it is difficult to reduce the communication load with a method of acquiring information only when needed. Moreover, the data collection timings of the data collection device and another device may clash, and in such cases, it is impossible to reduce the communication load at the moment of the clash.

Hence, a mechanism for reducing the communication load by another method is required.

Solution to Problem

A data collection device according to the present invention collects data from an industrial machine connected to a network, and when a request to acquire data about the industrial machine is received from a device other than the data collection device, the data collection device issues a network response on behalf of the industrial machine, thereby solving the problem described above.

One aspect of the present invention is a data collection device that collects data from an industrial machine, the data collection device including a state correlation information storage unit that stores state correlation information indicating correlative relationships between control information relating to control of the industrial machine and environment information relating to the environment of the industrial machine, a control information acquisition unit that acquires control information relating to control of the industrial machine from the industrial machine, an environment information acquisition unit that acquires environment information, which is acquired by detecting the state of the environment of the industrial machine, a state inference unit that infers the current state of the industrial machine on the basis of the control information acquired by the control information acquisition unit, the environment information acquired by the environment information acquisition unit, and the state correlation information stored in the state correlation information storage unit, and a proxy response unit that responds to an inquiry about an information item relating to the industrial machine from another device on behalf of the industrial machine on the basis of the inferred state of the industrial machine.

Advantageous Effects of Invention

According to this aspect of the present invention, a technique with which the state of an industrial machine can be inferred and issued as a response after storing states of the industrial machine is provided, making it possible for a data collection device to respond to another device on behalf of the industrial machine. Accordingly, the data collection device performs network communication with the outside, meaning that the industrial machine no longer performs network communication for the purpose of information collection, and this can contribute to energy saving and load reductions.

DESCRIPTION OF EMBODIMENTS

An embodiment of the present invention will be described below with reference to the drawings.

Figure 1:
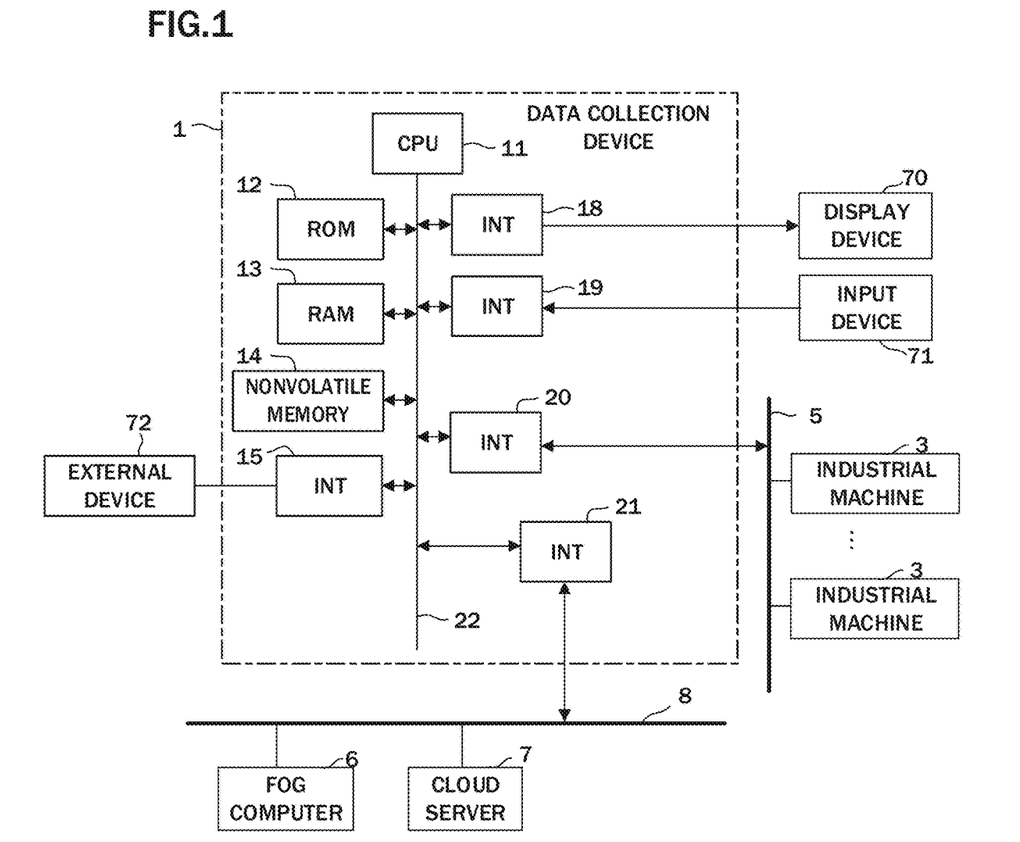
FIG. 1 is a schematic hardware configuration diagram of a data collection device according to an embodiment.

FIG. 1 is a schematic hardware configuration diagram showing main parts of a data collection device according to an embodiment of the present invention. A data collection device 1 of the present invention can be implemented in a personal computer, a fog computer, a cloud server, or the like that is connected to an industrial machine by a wired/wireless network, for example. In this embodiment, an example in which the data collection device 1 is implemented in a personal computer that is connected to an industrial machine by a wired/wireless network will be described.

A CPU 11 included in the data collection device 1 according to this embodiment is a processor for performing overall control of the data collection device 1. The CPU 11 reads a system program stored in a ROM 12 via a bus 22, and performs overall control of the data collection device 1 in accordance with the system program. Temporary calculation data and display data, various data input from the outside, and so on are temporarily stored in a RAM 13.

A nonvolatile memory 14 is constituted by an HDD (Hard Disk Drive), an SSD (Solid State Drive), or the like. The storage state of data written to the nonvolatile memory 14 is maintained even when a power supply of the data collection device 1 is switched off. The nonvolatile memory 14 stores data and a control program read from an external device 72 via an interface 15, data and a control program input via an input device 71, data acquired from an industrial machine 3 or another computer such as a fog computer 6 or a cloud server 7, and so on. The data and control programs stored in the nonvolatile memory 14 may be expanded to the RAM 13 at the time of execution/use. Further, various system programs such as a well-known analysis program are written in advance to the ROM 12.

The interface 15 is an interface for connecting the CPU 11 of the data collection device 1 to the external device 72, such as a USB device. A control program, parameters, and so on used to control the industrial machine, for example, can be read from the external device 72 side. Further, a control program, parameters, and so on that are edited in the data collection device 1 may be stored in external storage means via the external device 72 or transmitted to the industrial machine 3 or another computer, such as the fog computer 6 or the cloud server 7, via networks 5 and 8.

Data read to the memory, data acquired as a result of executing the control programs, system programs, and so on, and other data are output to a display device 70 via an interface 18 and displayed thereon. Further, the input device 71, which is constituted by a keyboard, a pointing device, or the like, transfers commands, data, and so on based on operations performed by an operator to the CPU 11 via an interface 19.

Interfaces 20 and 21 are interfaces for connecting the CPU 11 of the data collection device 1 to the wired or wireless networks 5 and 8. The industrial machine 3 (or a control device for controlling the industrial machine 3) is connected to the network 5 in order to exchange data with the data collection device 1. Further, the fog computer 6, the cloud server 7, and so on are connected to the network 8 in order to exchange data with the data collection device 1. Note that the networks 5 and 8 may be any networks on which the communication load can be physically or logically divided.

Figure 2:
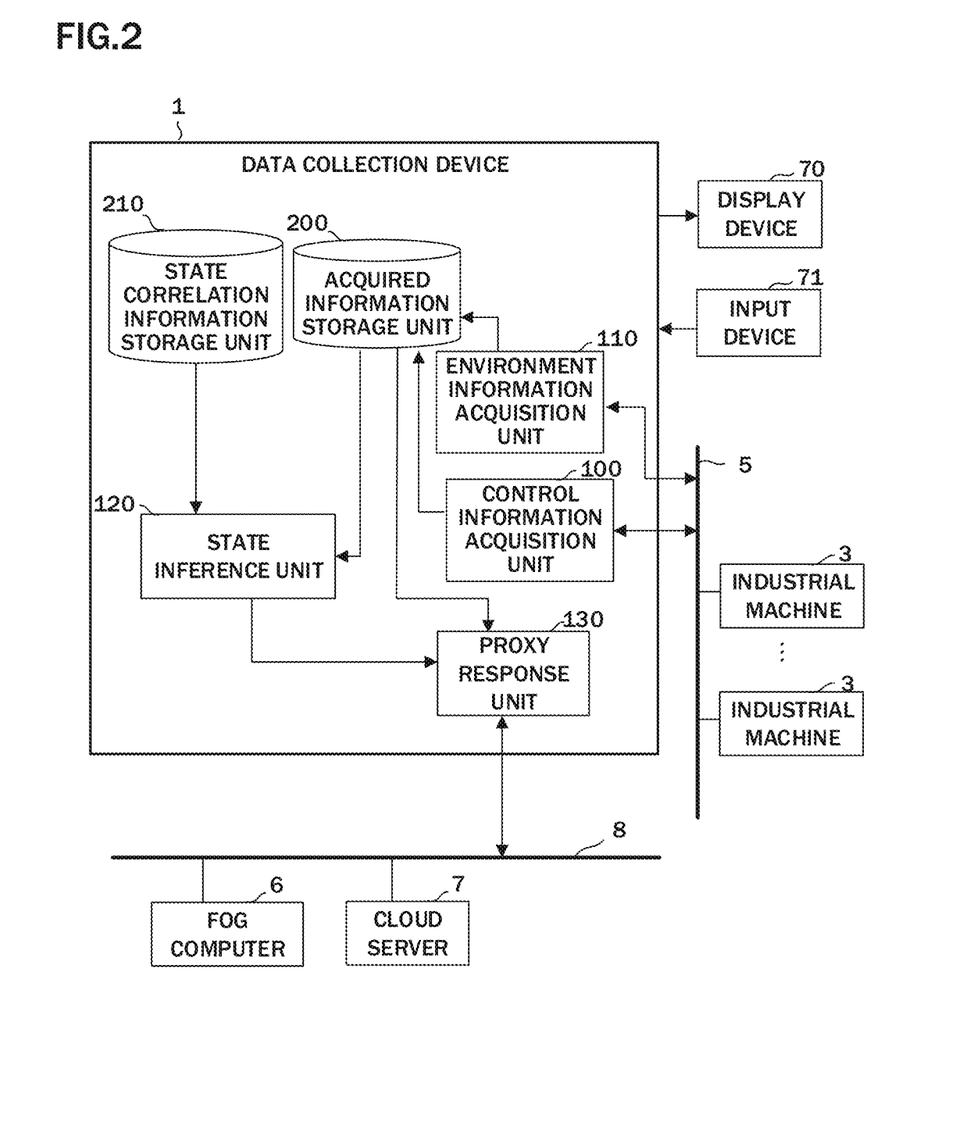
FIG. 2 is a schematic function block diagram of the data collection device according to the embodiment.

FIG. 2 is a schematic block diagram showing functions included in the data collection device 1 according to the embodiment of the present invention. The functions included in the data collection device 1 according to this embodiment are realized by having the CPU 11 included in the data collection device 1 shown in FIG. 1 execute the system program so as to control the operations of respective parts of the data collection device 1.

The data collection device 1 of this embodiment includes a control information acquisition unit 100, an environment information acquisition unit 110, a state inference unit 120, and a proxy response unit 130. Further, an acquired information storage unit 200 serving as an area to store information acquired from the industrial machine 3 and a state correlation information storage unit 210 serving as an area in which state correlation information, which is information indicating correlations between control information and environment information, is stored in advance are provided in advance in the RAM 13 or the nonvolatile memory 14.

The control information acquisition unit 100 is realized by having the CPU 11 of the data collection device 1 shown in FIG. 1 execute the system program read from the ROM 12 so that calculation processing is performed by the CPU 11 mainly using the RAM 13 and the nonvolatile memory 14, and input/output processing is performed using the interface 20. The control information acquisition unit 100 acquires control information relating to at least one industrial machine 3 via the network 5. The control information relating to the industrial machine 3 is information that can be acquired from the control device of the industrial machine 3, such as a spindle rotation speed, an axial position, the movement speed, the acceleration, and alarm information generated by the industrial machine 3, for example. The control information acquired by the control information acquisition unit 100 in relation to the industrial machine 3 may constitute a part of information items that can be included in control information envisaged as being used by the data collection device 1 on a manufacturing site. The control information relating to the industrial machine 3 may be constituted by data indicating instantaneous values detected at predetermined times, or time series data generated by acquiring values continuously. The control information acquired by the control information acquisition unit 100 is stored in the acquired information storage unit 200 in association with the times at which the data have been generated or detected and so on.

The environment information acquisition unit 110 is realized by having the CPU 11 of the data collection device 1 shown in FIG. 1 execute the system program read from the ROM 12 so that calculation processing is performed by the CPU 11 mainly using the RAM 13 and the nonvolatile memory 14. The environment information acquisition unit 110 acquires environment information relating to at least one industrial machine 3 via the network 5, for example. The environment information acquired by the environment information acquisition unit 110 in relation to the industrial machine 3 is constituted by detection values acquired by sensors disposed in the environment of the industrial machine 3, such as the environment temperature and vibration generated by the industrial machine 3, for example. The environment information acquired by the environment information acquisition unit 110 in relation to the industrial machine 3 may constitute a part of the information items that can be included in environment information envisaged as being used by the data collection device 1 on a manufacturing site. The environment information acquisition unit 110 may acquire the environment information from the control device of the industrial machine 3. Alternatively, the environment information acquisition unit 110 may acquire the environment information from sensors, a factory management system, and so on, not shown in the figures, disposed in respective locations via another interface, not shown in the figures. The environment information relating to the industrial machine 3 may be constituted by data indicating instantaneous values detected at predetermined times, or time series data generated by acquiring values continuously. The environment information acquired by the environment information acquisition unit 110 is stored in the acquired information storage unit 200 in association with the times at which the data have been detected and so on.

The state inference unit 120 is realized by having the CPU 11 of the data collection device 1 shown in FIG. 1 execute the system program read from the ROM 12 so that calculation processing is performed by the CPU 11 mainly using the RAM 13 and the nonvolatile memory 14. The state inference unit 120 infers the current state of the industrial machine 3 on the basis of the control information acquired by the control information acquisition unit 100, the environment information acquired by the environment information acquisition unit 110, and the state correlation information stored in the state correlation information storage unit 210.

Figure 3:
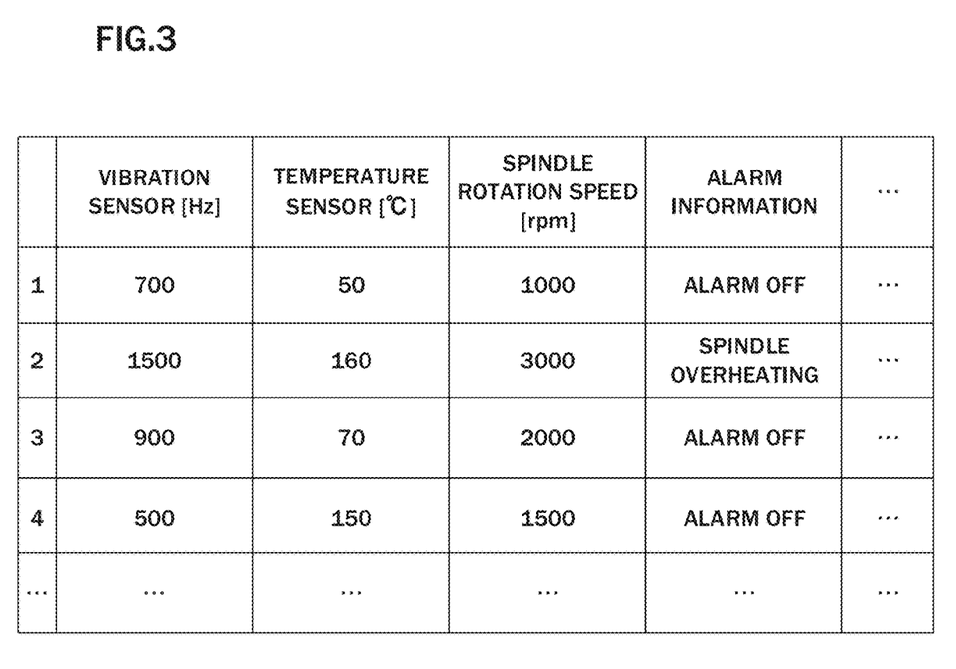
FIG. 3 is a view showing an example of state correlation information stored in a state correlation information storage unit.

As shown in FIG. 3, the state correlation information storage unit 210 stores a plurality of state correlation information in which information items that can be included in the control information and information items that can be included in the environment information acquired from the industrial machine 3 at the same time are associated with each other. The state correlation information preferably includes all of the information items that can be included respectively in the control information and the environment information envisaged as being used by the data collection device 1 on a manufacturing site. The state correlation information may be created using control information and environment information acquired at the same time by performing experiments in which the industrial machine 3 is operated under various conditions in advance, and stored in advance in the state correlation information storage unit 210. Alternatively, the state correlation information may be created using control information and environment information acquired at the same time from industrial machines 3 operated in factories in various locations, and stored in advance in the state correlation information storage unit 210. When the data collection device 1 acquires data from a plurality of industrial machines 3, state correlation information is stored in the state correlation information storage unit 210 for each industrial machine 3. In this case, when an inquiry relating to an information item of a predetermined industrial machine 3 is received from another device, the state inference unit 120 uses the state correlation information corresponding to that industrial machine 3 to infer the state of the industrial machine 3.

The state inference unit 120 retrieves state correlation information that resembles the control information and environment information acquired at a certain point in time, and infers control information or environment information that could not be acquired from the retrieved state correlation information.

Figure 4:
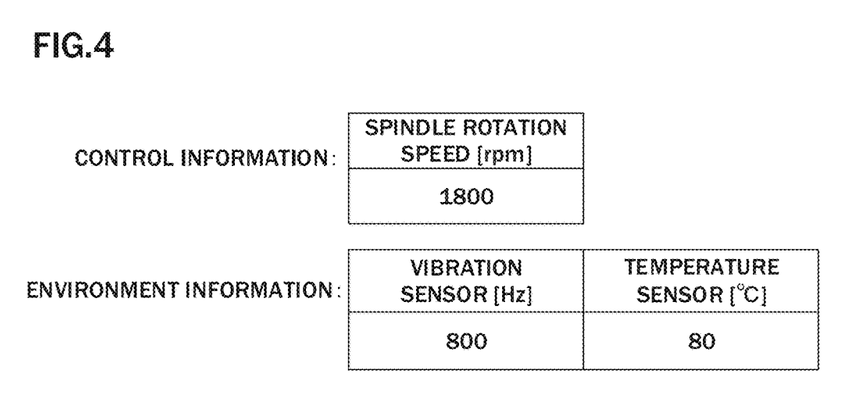
FIG. 4 is a view showing examples of control information and environment information.

As an example, it is assumed that the state correlation information shown in FIG. 3 is stored in the state correlation information storage unit 210. In this case, as shown in FIG. 4, when the control information acquisition unit 100 acquires spindle rotation speed: 1800 [rpm] as the control information and the environment information acquisition unit 110 acquires vibration value: 800 [Hz] and temperature: 80 [° C.] as the environment information, the state inference unit 120 calculates the similarities between the acquired control information and environment information and the respective sets of state correlation information stored in the state correlation information storage unit 210. The similarities may be calculated using formula 1, shown below, on the basis of the numerical value data included in the control information and the environment information, for example. At this time, selective data (data taking values such as "alarm on" or "alarm off", for example) included in the control information and environment information may be used for filtering of the state correlation information or the like, as will be described below. In formula 1, R denotes the similarity, $Ic_n$ (n=1, 2, ... ) denotes the control information successfully acquired by the control information acquisition unit 100, $Ie_m$ (m=1, 2, ... ) denotes the environment information successfully acquired by the environment information acquisition unit 110, $Icr_n$ (n=1, 2, ... ) and $Ier_m$ (m=1, 2, ... ) denote the control information and the environment information included in the state correlation information, and $a_i$ and $b_j$ (i and j=1, 2, ... ) respectively denote weight coefficients of the information items, which are determined in accordance with the characteristics of the industrial machine 3.

$$R = \frac{1}{\sqrt{\begin{array}{c} a_1(Ic_1 - Icr_1)^2 + a_2(Ic_2 - Icr_2)^2 + ... + \\ b_1(Ie_1 - Ier_1)^2 + b_2(Ie_2 - Ier_2)^2 + ... \end{array}}} \qquad \text{[Formula. 1]}$$

Figure 5:
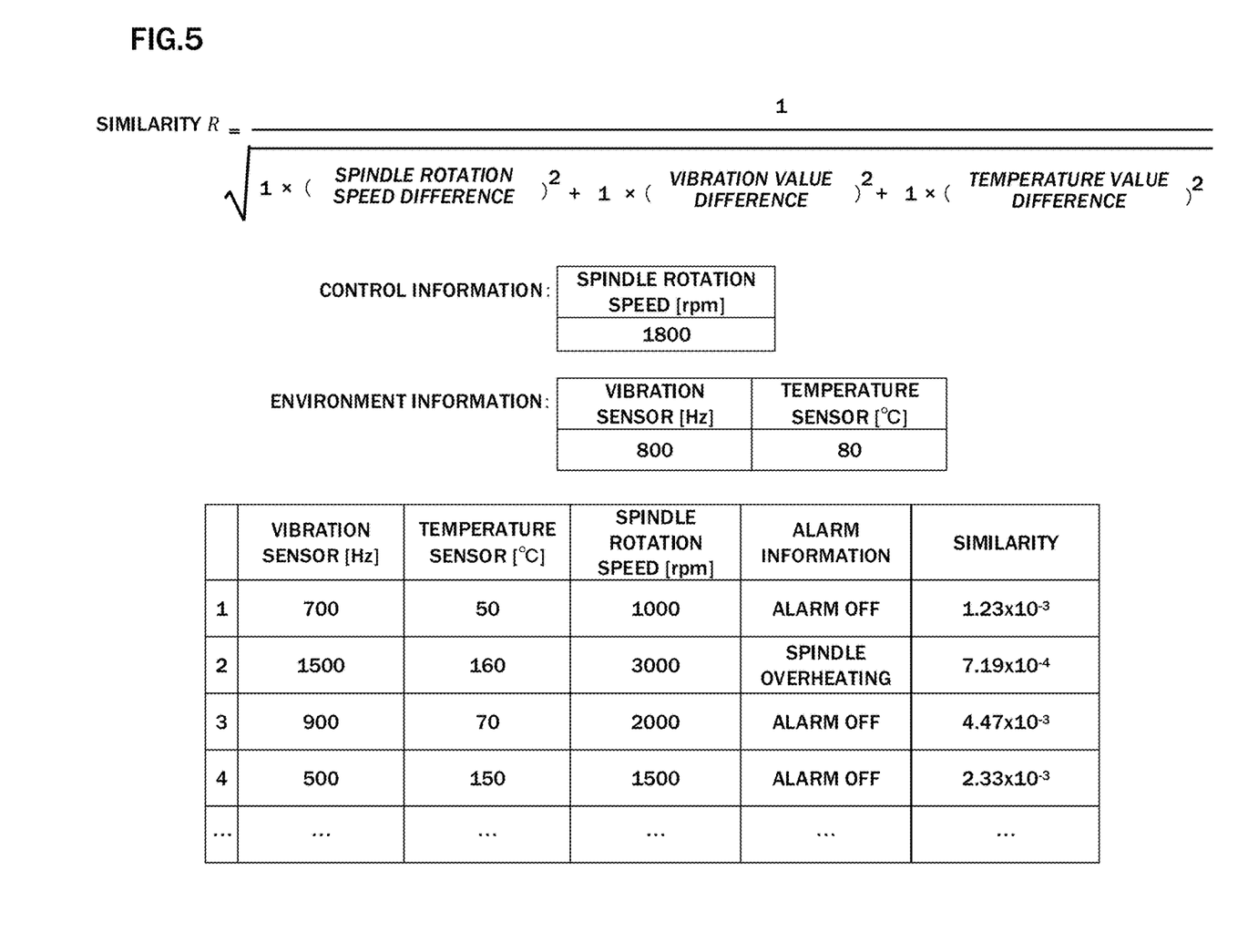
FIG. 5 is a view showing an example of a similarity calculation.

In the example in FIGS. 3 and 4, the spindle rotation speed is acquired as the control information, and a vibration value and a temperature value are acquired as the environment information. Here, when the similarities are calculated using 1 as the weight coefficient of each information item, the similarities between the acquired information and the respective sets of state correlation information are calculated as shown in FIG. 5. The state inference unit 120 then infers that the third set of state correlation information, which has the highest similarity, is closest to the state of the industrial machine 3 at the point in time when the information has been acquired.

Figure 6:
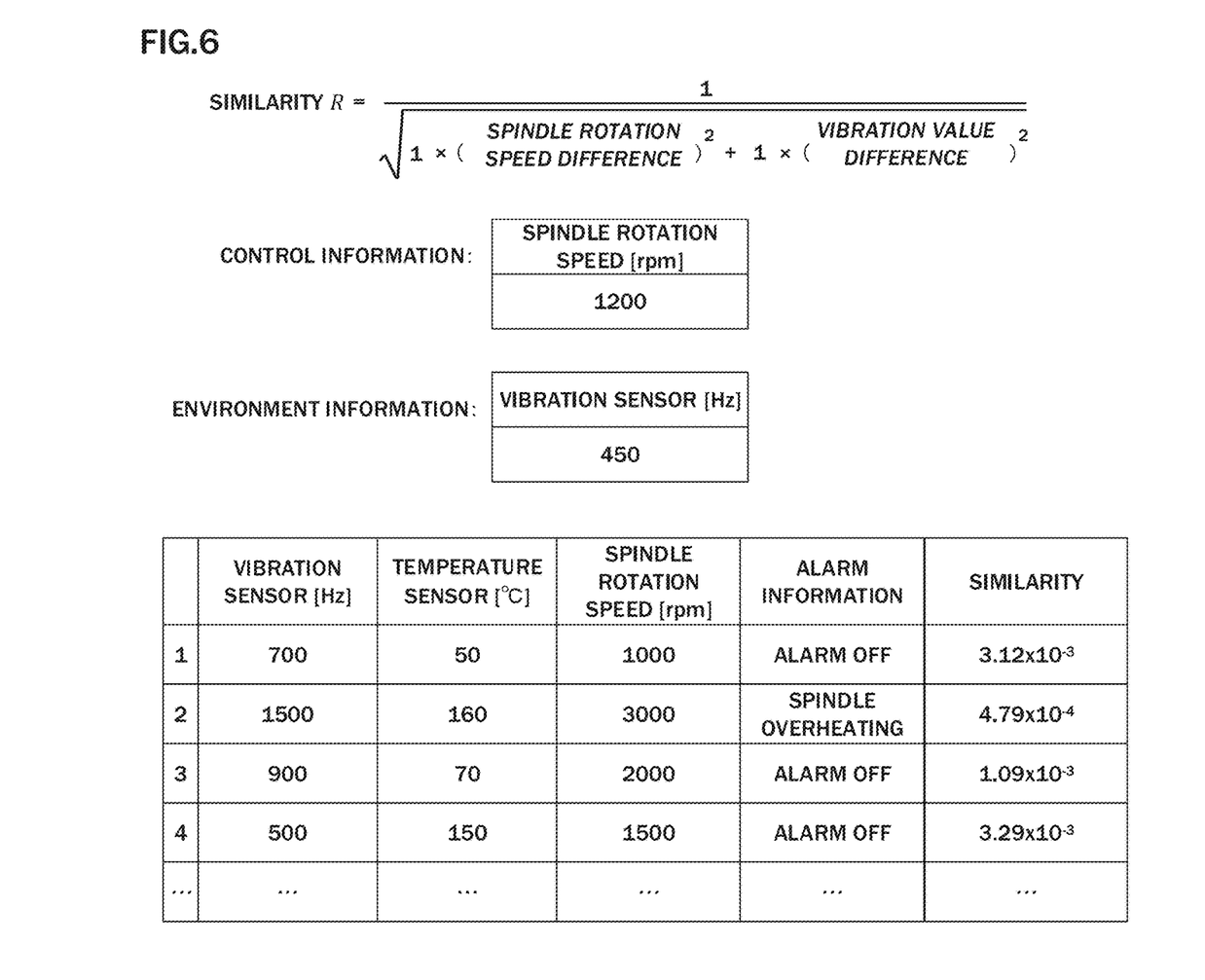
FIG. 6 is a view showing another example of the similarity calculation.

In another example, as shown in FIG. 6, for example, when a temperature sensor is not attached to the industrial machine 3 so that the spindle rotation speed is acquired as the control information and only the vibration value is acquired as the environment information, the state inference unit 120 calculates the similarities between the acquired information and the respective sets of state correlation information and infers as a result that the fourth set of state correlation information, which has the highest similarity, is closest to the state of the industrial machine 3 at the point in time when the state has been acquired.

Note that a state inference method using a similarity calculation formula, such as that described above, is an example, and any other method with which the state of the industrial machine 3 can be inferred may be employed as appropriate.

Figure 7:
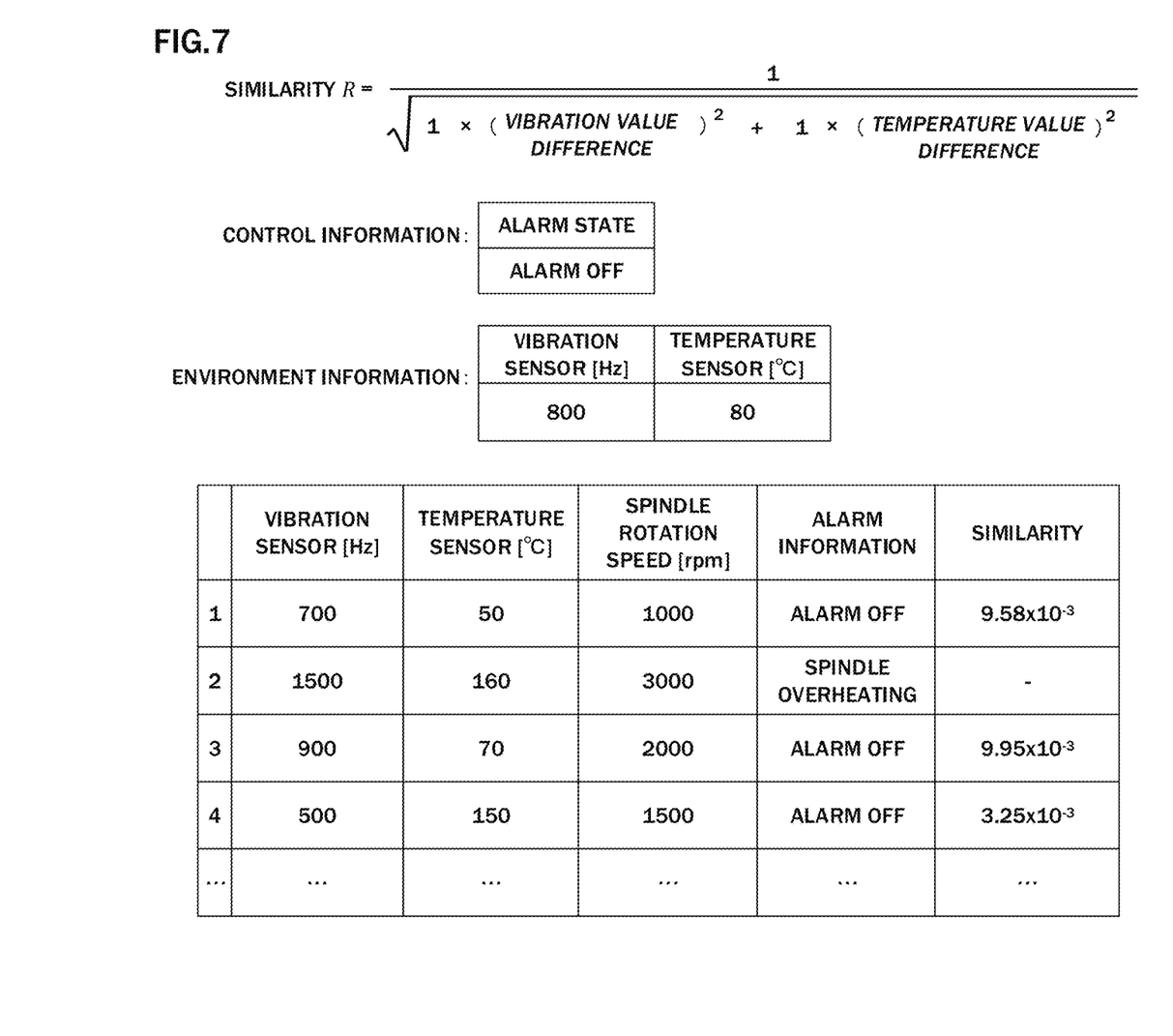
FIG. 7 is a view showing another example of the similarity calculation.

In another example, as shown in FIG. 7, for example, when the spindle rotation speed cannot be acquired from the industrial machine 3 so that alarm information is acquired as the control information and the temperature value and vibration value are acquired as the environment information, the state inference unit 120 calculates the similarities with the respective sets of state correlation information after filtering the state correlation information in relation to the alarm state indicating the state, and infers as a result that the third set of state correlation information, which has the highest similarity, is closest to the state of the industrial machine 3 at the point in time when the state has been acquired.

Note that a state inference method using a similarity calculation formula, such as that described above, is an example, and any other method with which the state of the industrial machine 3 can be inferred may be employed as appropriate.

The proxy response unit 130 is realized by having the CPU 11 of the data collection device 1 shown in FIG. 1 execute the system program read from the ROM 12 so that calculation processing is performed by the CPU 11 mainly using the RAM 13 and the nonvolatile memory 14, and input/output processing is performed using the interface 21. When an inquiry relating to the state of the industrial machine 3 is received from another device via the network 8, the proxy response unit 130 issues a response relating to the information item about which the inquiry has been issued on behalf of the industrial machine 3 on the basis of the inference result of the state of the industrial machine 3, inferred by the state inference unit 120. For example, when an inquiry relating to the state of the alarm is received from the fog computer 6 serving as a monitoring server in the situation illustrated in FIG. 5, the proxy response unit 130 issues a proxy response to the fog computer 6 indicating the state of the alarm (alarm off) in the third set of state correlation information inferred by the state inference unit 120. When an inquiry relating to the temperature of the industrial machine 3 is received from the cloud server 7 serving as an analysis server in the situation illustrated in FIG. 6, for example, the proxy response unit 130 issues a proxy response to the cloud server 7 indicating the temperature value (150° C.) in the fourth set of state correlation information inferred by the state inference unit 120. When an inquiry relating to the spindle rotation speed of the industrial machine 3 is received from the fog computer 6 in the situation illustrated in FIG. 7, for example, the proxy response unit 130 issues a proxy response to the cloud server 7 indicating the spindle rotation speed (2000) in the third set of state correlation information inferred by the state inference unit 120. When an information item about which an inquiry has been issued from another device is included in the information acquired by the control information acquisition unit 100 or the environment information acquisition unit 110, the proxy response unit 130 may issue a proxy response on the basis of the acquired information.

The data collection device 1 according to this embodiment, having the configuration described above, responds to an inquiry for an information from another device in relation to the industrial machine 3 on behalf of the industrial machine 3. As a result, the communication load of direct inquiries to the industrial machine 3 can be reduced.

Further, with the data collection device 1 according to this embodiment, having the configuration described above, when data that have not actually been acquired from the industrial machine 3 exist, the state inference unit 120 can infer the state of the industrial machine 3 using the state correlation information stored in the state correlation information storage unit 210. Accordingly, a proxy response indicating data values that have not actually been acquired can be issued on the basis of the inference result. Thus, the number of data items acquired by the data collection device 1 from the industrial machine 3 can be reduced, and as a result, the communication load of direct inquiries to the industrial machine 3 can be reduced. Moreover, some sensors or the like can be omitted, leading to a cost reduction.

Furthermore, by collecting sufficient state correlation information in advance in relation to the subject industrial machine 3, even when some of the data to be collected are missing, it is possible to supplement reasonably accurate data values in accordance with the other information.

Note that when the similarities calculated by the state inference unit 120 have the same value in a plurality of sets of the state correlation information, the proxy response unit 130 may issue a plurality of responses to the other device from which the inquiry has been received, or may calculate a statistic such as a median value or a mean value from the values of the corresponding information item in the plurality of sets of state correlation information and issue this statistic as the response.

Further, when an alarm occurs in the industrial machine 3 so that the control information acquisition unit 100 and the environment information acquisition unit are unable to acquire the control information and the environment information, the proxy response may be interrupted, or a response result (an error response corresponding to the alert or the like) acquired from the industrial machine 3 may be transmitted directly to the other device. Alternatively, a proxy response indicating that a stoppage is underway due to the alarm may be issued.

An embodiment of the present invention has been described above, but the present invention is not limited only to the embodiment described above and may be implemented in various forms by adding modifications as appropriate.

In the example illustrated in the above embodiment, a plurality of sets of control information and environment information acquired at predetermined timings are stored in the state correlation information storage unit 210 as the state correlation information, and the state inference unit 120 and proxy response unit 130 operate using this information. Instead, a plurality of sets of control information and environment information may be stored as the state correlation information in the form of time series data acquired over a predetermined period. In this case, the state inference unit 120 calculates the similarities between the sets of time series data acquired by the control information acquisition unit 100 and the environment information acquisition unit 110 and the respective sets of state correlation information using a well-known method for calculating similarities between time series data, such as dynamic time warping. The proxy response unit 130 may then issue a proxy response (the final value of the time series data, for example) on the basis of the similar state correlation information. According to this configuration, although the amount of calculation relating to inference of the state of the industrial machine 3 by the state inference unit 120 increases, the variation tendencies of the values of the control information and environment information can be reflected in the similarity calculation, and therefore a certain degree of improvement in the inference accuracy can be expected.

Figure 8:
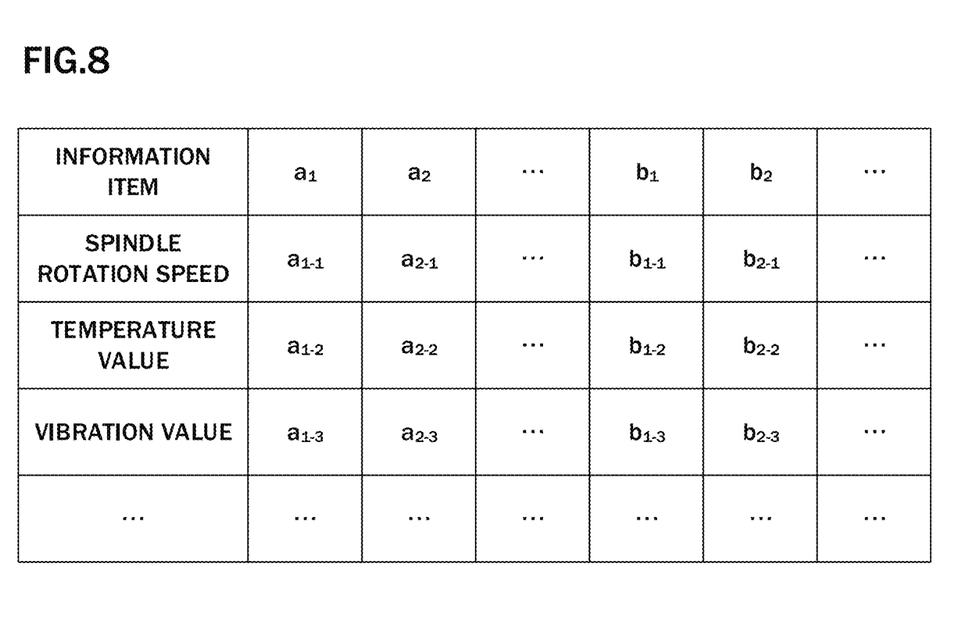
FIG. 8 is a view showing another example of a similarity calculation method.

Furthermore, the state inference unit 120 may calculate the similarities between the control information and environment information acquired by the control information acquisition unit 100 and the environment information acquisition unit 110 and the state correlation information differently according to the information item about which an inquiry has been received from another device. For example, in the above embodiment, it is assumed that the weight coefficients $a_i$, $b_j$ of formula 1 are determined according to the characteristics of the industrial machine 3. As shown in FIG. 8, the weight coefficients $a_i$, $b_j$ may take different values according to the information item of the response issued to the other device. For example, when a response is issued in relation to the spindle rotation speed, a weight coefficient relating to information having a close correlation with the spindle rotation speed is set to be higher, and a weight coefficient relating to information not having a close correlation is set to be lower. By modifying the similarity calculation formula in accordance with the information item about which the inquiry has been received from the other device and inferring the state of the industrial machine 3 in accordance with the similarly calculated using the modified formula, a certain degree of improvement in the inference accuracy can be expected.

Moreover, the state inference unit 120 may also infer the state of the industrial machine 3 using machine learning technology. In this case, machine learning devices (regression formulas, neural networks, or the like, for example) are created in advance in order to respectively infer information items that cannot be acquired from the control information and environment information that can be acquired from the industrial machine 3 on the basis of the data stored in the state correlation information storage unit 210. Then, when an inquiry relating to a predetermined information item is received from another device, the information item about which the inquiry has been received may be inferred using the machine learning device that is capable of inferring the information item from the control information and environment information acquired from the industrial machine 3, whereupon the proxy response unit 130 may return the inference result to the other device. When this method is employed, it is also possible to address cases in which data are missing by creating in advance a machine learning device that has been trained by omitting several information items from the control information and environment information that can be acquired from the industrial machine 3. By employing this configuration, data values of control information and environment information not stored in the state correlation information storage unit 210 can be inferred by the machine learning device, and therefore a certain degree of improvement in the inference accuracy can be expected.

The invention claimed is:

1. A data collection device for collecting data from an industrial machine via a network, the data collection device comprising:
a memory that stores state correlation information indicating correlative relationships between stored control information of the industrial machine and stored environment information of the industrial machine; and
a processor configured to
acquire control information from the industrial machine;
acquire environment information, which is acquired by detecting a state of environment of the industrial machine;
infer a current state of the industrial machine on the basis of the acquired control information, the acquired environment information, and the state correlation information stored in the memory; and
respond via the network, on behalf of the industrial machine and on the basis of the inferred state of the industrial machine, to an inquiry about an information item including at least one of the acquired control information or the acquired environment information of the industrial machine from a device external from the industrial machine and the data collection device,
wherein
the processor is further configured to
retrieve, from the memory, the state correlation information that resembles the acquired control information and the acquired environment information acquired at a certain point in time, and
infer further control information or further environment information that are not acquired from the retrieved state correlation information, and
the data collection device is configured to output data to a control device for the industrial machine to control the industrial machine.

2. The data collection device according to claim 1, wherein the processor is configured to infer the current state of the industrial machine depending on the information item about which the inquiry has been issued from other device external from the industrial machine and the data collection device.

3. The data collection device according to claim 1, wherein the processor is configured to infer the current state of the industrial machine by machine learning.

4. The data collection device according to claim 1, wherein the processor is configured to infer the current state of the industrial machine by using the further control information or the further environment information that are not included from the retrieved state correlation information.

5. The data collection device according to claim 1, wherein the processor is configured to infer the current state of the industrial machine by calculating similarities between (i) the acquired control information and (ii) the stored control information in the state correlation information, and between (a) the acquired environment information and (b) the stored environment information in state correlation information.

6. The data collection device according to claim 1, wherein the device external from the industrial machine and the data collection device includes a monitoring computer.

7. The data collection device according to claim 6, wherein in response to receiving an inquiry regarding a state of an alarm, the processor is configured to respond via the network, on behalf of the industrial machine and on the basis of the inferred state of the industrial machine, to the monitoring computer indicating the state of the alarm.

8. The data collection device according to claim 1, wherein the device external from the industrial machine and the data collection device includes a cloud server.

9. The data collection device according to claim 8, wherein in response to receiving an inquiry regarding a temperature of the industrial machine, the processor is configured to respond via the network, on behalf of the industrial machine and on the basis of the inferred state of the industrial machine, to the cloud server indicating a value of the temperature of the industrial machine.

10. The data collection device according to claim 1, wherein the control information includes at least one of a spindle rotation speed, an axial position, a movement speed, an acceleration, or alarm information generated by the industrial machine.

11. The data collection device according to claim 1, wherein the environment information includes at least one of vibration information of the industrial machine or temperature information of the industrial machine.

12. A system, comprising:
an industrial machine;
a data collection device configured to collect data from the industrial machine via a network; and
a device external from the industrial machine and the data collection device,
wherein the data collection device includes:
  a memory that stores state correlation information indicating correlative relationships between stored control information of the industrial machine and stored environment information of the industrial machine; and
  a processor configured to
    acquire control information from the industrial machine;
    acquire environment information, which is acquired by detecting a state of environment of the industrial machine;
    infer a current state of the industrial machine on the basis of the acquired control information, the acquired environment information, and the state correlation information stored in the memory; and
    respond via the network, on behalf of the industrial machine and on the basis of the inferred state of the industrial machine, to an inquiry about an information item including at least one of the acquired control information or the acquired environment information of the industrial machine from the device external from the industrial machine and the data collection device,
wherein
the processor is further configured to
  retrieve, from the memory, the state correlation information that resembles the acquired control information and the acquired environment information acquired at a certain point in time, and
  infer further control information or further environment information that are not acquired from the retrieved state correlation information, and
the data collection device is configured to output data to a control device for the industrial machine to control the industrial machine.

* * * * *